May 7, 1963  A. J. FERRO  3,088,575
ARTICLE TRANSFER MEANS
Filed Feb. 6, 1961  3 Sheets-Sheet 2

INVENTOR.
ANTHONY J. FERRO
BY
Otto Moeller
ATTORNEY

May 7, 1963     A. J. FERRO     3,088,575
ARTICLE TRANSFER MEANS

Filed Feb. 6, 1961     3 Sheets-Sheet 3

INVENTOR.
ANTHONY J. FERRO
BY
*Otto Moeller*
ATTORNEY

United States Patent Office 3,088,575
Patented May 7, 1963

3,088,575
ARTICLE TRANSFER MEANS
Anthony J. Ferro, York, Pa., assignor, by mesne assignments, to Baker Perkins, Inc., New York, N.Y., a corporation of New York
Filed Feb. 6, 1961, Ser. No. 87,341
8 Claims. (Cl. 198—24)

This invention relates to conveyors and more particularly to a discharge conveyor adapted to receive successive rows of pans of proofed dough from a dough proofer and to convey them away from the proofer.

The invention is described hereinafter as applied to a rack type proofer, such as shown in Temple Patent No. 2,823,811, granted February 18, 1958, though it will become apparent that the invention may be used with other types of rack or tray proofers and is also susceptible of other applications wherein pans of proofed dough are transferred from one conveyor or support to another conveyor. In the rack type proofer herein illustrated and described, embodying the invention, a plurality of multi-shelved racks are movable in a closed loop through a proofing chamber, along one run of which is provided a loading and unloading station for loading rows of pans of unproofed dough onto successive rack shelves and for unloading rows of pans of proofed dough from successive rack shelves.

The closed rack conducting loop includes upper and lower tracks pendently supporting and along which contiguous racks are adapted to be pushed; elevating means for engaging and raising successive racks through a loading and unloading station and releasing them on the upper tracks to push the row of contiguous racks ahead; and lowering means for engaging and lowering successive racks and releasing them on the lower tracks to push the row of contiguous racks ahead. At the loading and unloading station adjacent the racks being elevated there is provided a horizontal transversely extending infeed or loading conveyor for introducing successive rows of pans of unproofed dough, and a horizontal transversely extending discharge or unloading conveyor for carrying away successive rows of pans of proofed dough. A loading pusher transfers successive rows of pans of unproofed dough from the infeed conveyor onto successive shelves of the racks, and an unloading pusher transfers successive rows of pans of proofed dough from successive rack shelves onto the discharge conveyor.

It is important, as each rack stops preparatory to unloading a row of pans of proofed dough from a rack shelf onto the unloading or discharge conveyor that the plane of the shelf being unloaded is not at a level below the plane of the discharge conveyor, otherwise the near upper edge of the discharge conveyor forms an abutment in the path of the pans being pushed from a rack shelf by the unloading pusher. Engagement of the pans against this abutment prevents unloading of the pans, with consequent jamming of the apparatus or stopping of the apparatus where controls are employed. However, even if the pans should ride up over the abutment, the impact of the pans against such abutment will cause collapse of the proofed dough resulting in an unsalable product.

In order to overcome this objectionable condition under all operating conditions, the rack is arranged under normal conditions to stop so that the plane of the shelf to be unloaded is a substantial distance, preferably about one-half inch, above the plane of the discharge conveyor, or a distance to insure against the plane of the shelf being below that of the discharge conveyor under all conditions. Variable conditions of the brake for the rack elevating motor will cause fluctuations in the stopping point of the rack shelf, as will also expansion and contraction of parts due to changes in temperature, wear on the chain links of the rack elevator, the load on the rack shelves and other conditions. In addition, warping of the rack shelves or the racks themselves or inaccuracies in the spacing of the shelves of a rack may cause a rack shelf in its unloading position to become misaligned with respect to the discharge conveyor. For these reasons, the rack is arranged to stop so that the plane of the rack shelves in their unloading position would normally be about one-half inch above the plane of the discharge conveyor.

It has, however, been found that with the plane of shelves in their unloading position and the plane of the discharge conveyor so spaced that the dropping of the pans of proofed dough onto the discharge conveyor as they are slid from the rack shelf by the unloading pusher, causes a jar that frequently causes collapse of the proofed dough resulting in a poor or unsalable loaf of bread. Proofed dough is very sensitive to jarring of the pan and more so to the jar resulting in dropping of the pan than to endwise jarring of the pan.

It is therefore a broad object of the invention to slidably transport pans of proofed dough or other articles requiring delicate handling from a first support or conveyor to a second support or conveyor, wherein the first support or conveyor is at a higher elevation than the second support or conveyor, with a minimum of jarring of the pans of proofed dough or other articles.

More specifically, an object of the invention resides in the provision of means, in a proofer of the type described above, for transferring rows of pans of proofed dough from successive shelves of the proofer racks onto the discharge conveyor in a smooth and gentle manner.

Moreover, it is an object of the invention to provide means in a proofer of the type described above for the smooth transfer of pans of proofed dough from successive shelves of the racks to the discharge conveyor with a minimum of shock or jar irrespective of the conditions set forth above that may vary the stopping point within certain limits of the rack shelf with respect to the discharge conveyor.

Other objects and advantages reside in certain novel features of construction, arrangement and combination of parts which will be hereinafter more fully described, reference being had to the accompanying drawings showing an exemplary embodiment of the invention. Referring to the drawings:

FIGURE 4 is a sectional view taken on line 4—4 of FIGURE 2;

Figure 1:
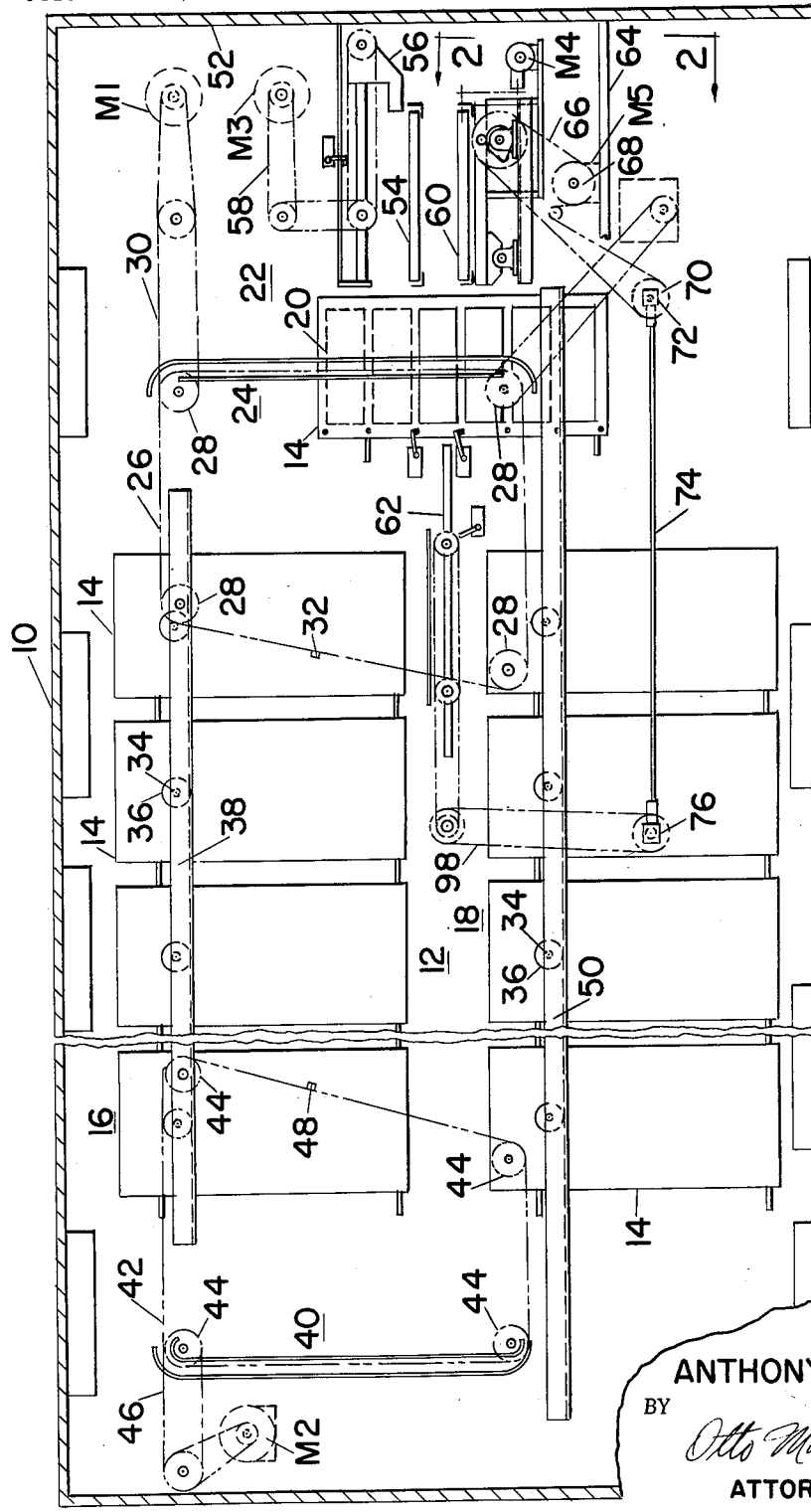
FIGURE 1 is a longitudinal vertical sectional view through a dough proofer housing with the various elements contained therein shown more or less diagrammatically.

Referring particularly to FIGURE 1, the proofer comprises a generally rectangular elongated housing 10 defining a proofing chamber 12 through which racks 14, carrying pans of dough to be proofed, travel in an elongated closed loop having an upper horizontal run 16 and a lower horizontal run 18.

The housing 10 is preferably formed of sheet metal panels supported by suitable skeleton framework, and air under such temperature and relative humidity suitable for the proofing of the dough is supplied to the proofing chamber 12 by suitable air conditioning means, not shown.

The racks 14 are of generally conventional design, being in the nature of an open rectangular framework having a plurality of vertically spaced horizontal shelves 20, the whole being made up of metal bars, angles, tubing or the like. The shelves 20 are equidistantly spaced, and for purpose of illustration the racks 14 are shown with seven shelves, though racks with a greater or lesser number of shelves may be used.

The forward end of the proofing chamber 12 is arranged to provide a loading and unloading station 22, at which station successive transverse rows of pans of dough to be proofed are loaded onto successive rack shelves and successive transverse rows of pans of dough that have been proofed are unloaded from successive rack shelves.

A rack elevator, indicated generally by reference numeral 24, raises successive racks in stepwise fashion to permit loading and unloading of the rack shelves. Rack elevator 24 includes endless chain means 26 trained over sprockets 28, arranged to be operated by motor M1 through appropriate chain and sprocket means 30. The lugs 32 of the rack elevating chain means 26 are arranged to engage stub shafts 34 extending outwardly from the opposite ends of the racks 14, thereby picking up a rack from lower run 18, elevating it through the loading and unloading station 22, depositing it on upper run 16 with the rollers 36 carried by the rack stub shafts 34 engaging the upper tracks 38, whereupon the row of racks on upper run 16 are pushed rearwardly.

A rack lowerer, indicated generally by reference numeral 40, lowers successive racks 14 from upper run 16 to lower run 18. Rack lowerer 40 includes endless chain means 42 trained over sprockets 44, arranged to be operated by motor M2 through appropriate chain and sprocket means 46. Latch and lug means 48 of the rack lowering chain means 42 are arranged to engage the rack stub shafts 34, thereby transporting a rack from upper run 16, lowering and depositing it on lower run 18 with the rollers 36 engaging the lower tracks 50, whereupon the row of racks on lower run 18 are pushed forwardly.

The particular rack elevating and lowering means and associated means for moving the racks in a closed loop through the proofer chamber 12 does not constitute the present invention and may conveniently be of any suitable type as shown in Temple Patent 2,823,811, referred to above, or Temple Patent No. 2,866,565 granted December 30, 1958.

A pair of horizontal vertically spaced conveyors extend transversely of the proofer housing 10 through a suitable opening, not shown, in a side wall thereof into the loading and unloading station 22 between rack elevator 24 and the front wall 52 of the proofer housing 10, so that the shelves of the racks 14 can be successively brought into position with respect to the conveyors for loading and unloading as the racks 14 are elevated through the loading and unloading station 22. These conveyors may be of any suitable type for conveyance of bread pans, for example, powered roll conveyors. The upper conveyor 54, hereinafter referred to as the loading conveyor, is operated by a suitable motor, not shown, and conveys the pans of dough into the proofer to a position in front of a rack being elevated by the elevator 24, where reciprocating pusher means, hereinafter referred to as the loading pusher 56, pushes successive rows of pans of dough to be proofed from the loading conveyor 54 onto successive shelves of a rack 14 as the latter is intermittently elevated through the loading and unloading station 22. The loading pusher 56 is operated by motor M3 through appropriate drive means 58.

The lower conveyor 60, hereinafter referred to as the unloading conveyor, is operated by motor M4 and is adapted to convey rows of pans of proofed dough from the proofer, successive rows of pans of proofed dough being pushed from successive shelves of a rack 14 in the loading and unloading station 22 by reciprocating pusher means, hereinafter referred to as the unloading pusher 62. The unloading pusher 62 may be of any suitable type, preferably as shown in the above referred to Temple Patent No. 2,823,811, and is therefore not described in detail.

The means for operating the reciprocating pusher 62 includes a motor M5 mounted on a bracket 64 and disposed in the lower forward end of the proofer housing 10 and adjacent one side thereof. A sprocket chain 66 trained over motor sprocket 68 and a sprocket 70 of a conventional bevel gear unit 72 at the forward end of a longitudinally extending torque tube 74 rotates the latter. The rearward end also of the torque tube 74 is provided with a conventional bevel gear unit 76 which through sprocket and chain means provides a drive connection to the reciprocating unloading pusher 62.

The lower or discharge conveyor 60 includes a pair of transversely extending spaced parallel side rails 78 and 80, with the rear rail 78 disposed adjacent the path of travel of the racks 14 through the loading and unloading station 22. The rails 78 and 80 are rigidly supported in any suitable manner on a conveyor support frame 82. The conveyor support frame 82 is rectangular in shape, being preferably formed by longitudinally extending channel members 84 rigidly connected at their forward ends by transversely extending channel member 86. The conveyor 60 and its support frame 82 are tiltably supported as a unit, in a manner hereinafter described in detail, on a conveyor support 88 preferably in the form of longitudinally extending angle members 90 rigidly secured at their ends to frame members of the proofer housing 10.

Figure 2:
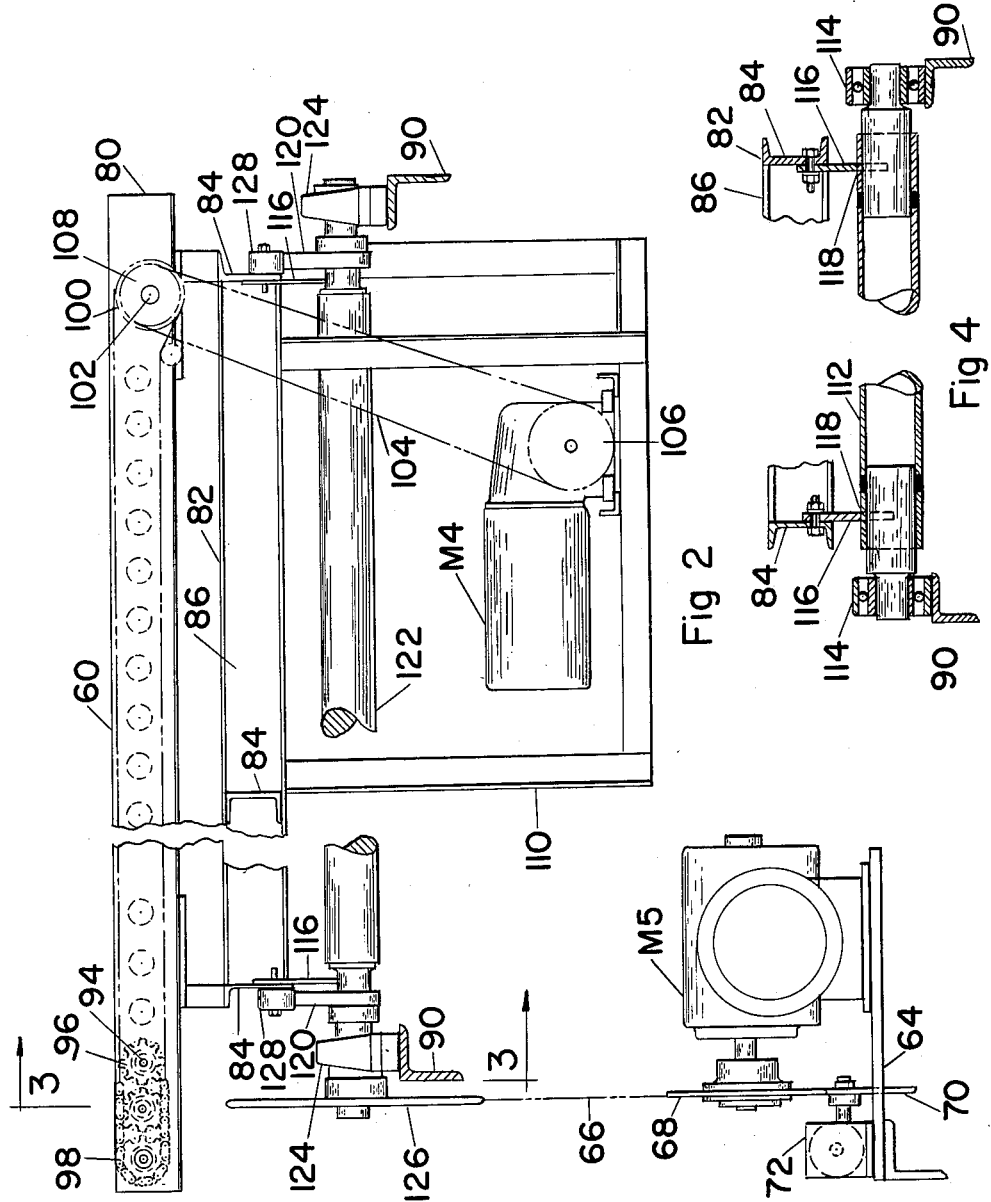
FIGURE 2 is a view on an enlarged scale of the discharge conveyor taken on line 2—2 of FIGURE 1.

The discharge conveyor 60 includes a multiplicity of rollers 92 disposed crosswise between the rails 78 and 80 to define a path along which the pans of proofed dough may be moved. Rollers 92 are fixed on shafts 94, the ends of which shafts extend through and are mounted in well known manner in the side rails 78 and 80. Mounted on shafts 94 between the ends of the rollers 92 and the side rail 80 are sprockets 96, and as shown, an endless chain 98 trained over the roller sprockets 96 and a drive sprocket 100 mounted on a shaft 102 extending crosswise of and journaled in the side rails 78 and 80 at the right hand ends thereof, drives the rollers 92. The drive for the rollers is completed by means of a sprocket chain 104 which is trained over sprocket 106 of motor M4 and sprocket 108 on shaft 102, as best shown in FIGURE 2. The motor M4 is rigidly supported on a skeleton frame bracket 110, depending from and rigidly secured to the right hand end of the conveyor support frame 82.

The discharge conveyor motor M4 is arranged to be operated intermittently and is timed with the operation of the unloading pusher 62 and the rack elevator 24. Thus, when a rack 14 stops with a shelf 20 in unloading position, the operation of the discharge conveyor rollers 92 is interrupted and operation of the pusher 62 is initiated to push a row of pans of proofed dough onto the discharge conveyor rollers 92. Upon return of the pusher 62 to its retracted position, the elevator 24 moves upward and the conveyor rollers 92 are operated to discharge the row of pans. The timing means does not constitute a part of the present invention, and any suitable means such as described in the aforementioned Temple patents may be employed.

Figure 3:
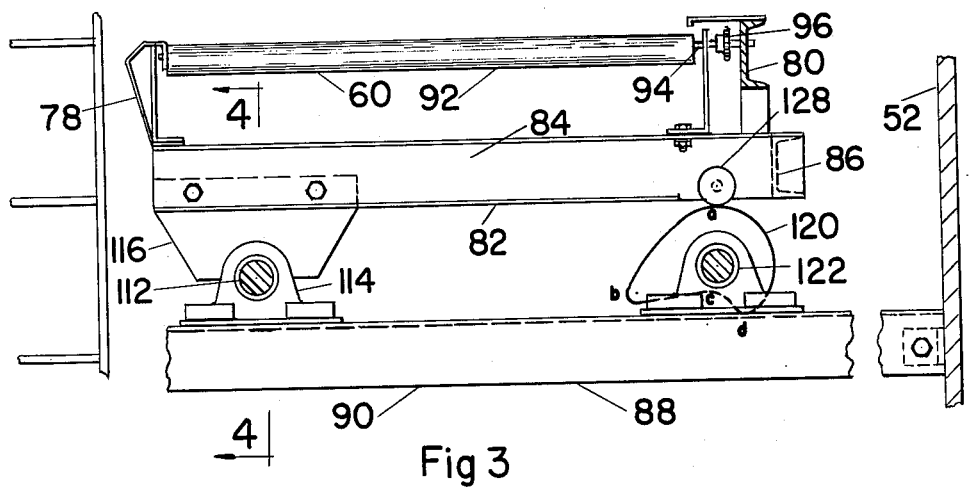
FIGURE 3 is a sectional view taken on line 3—3 of of FIGURE 3.

The tiltable mounting of the conveyor 60 includes a transversely extending shaft 112 mounted at its ends in bearings 114 supported on angle members 90 of the conveyor support 88. Rigidly fastened to the inner faces of opposite channel members 84 of the conveyor support frame 82 and depending therefrom adjacent the rearward side thereof are longitudinally extending plates 116 as best shown in FIGURES 3 and 4. The lower edge of each of the plates 116 is provided with a semi-circular recess 118 embracing the shaft 112, and to which shaft the plates 116 are secured in suitable manner, as by welding.

Referring particularly to FIGURE 3, the forward side of the conveyor 60 is supported by cams 120 which in the position shown maintain the conveyor 60 in a horizontal position. The supporting arrangement for the conveyor 60 is such that, in the position shown in FIGURE 3, the horizontal plane of the supporting surface of the rollers 92 is below, preferably about one-half inch, the plane of the shelf of a rack when in its unloading position. With such a normal spacing between the planes of the shelf to be unloaded and the supporting surface of the discharge conveyor, ramming of the pans against the side of the conveyor due to irregularities in the stopping point of the rack under conditions previously explained, is prevented. However, as also pointed out above, the jar resulting from the dropping of the pans of proofed dough onto the discharge conveyor 60 as they are slid from the rack shelf by the unloading pusher 62, frequently causes collapse of the proofed dough resulting in a poor or unsalable loaf of bread. The construction and arrangement of elements and their operative cooperation for preventing the jarring of the pans will now be described.

As prevoiusly set forth, the cams 120 normally support the conveyor 60 in horizontal position. The cams 120 are fixed on and a short distance inwardly of the opposite ends of a horizontal transversely extending shaft 122 which is disposed beneath the forward side portion of the conveyor 60 and is journaled at its ends in bearings 124 mounted on angle members 90 of the conveyor support 88. Sprocket chain 66 which, as previously described, operates the unloading pusher 62, is also trained over a sprocket 126 fixed on one end of the shaft 122, so that cams 120 are rotated in timed relation with the unloading pusher 62. The sprockets for operating the unloading pusher 62 and the cams 120 are formed to rotate the cams 120 through one revolution for one complete operation of the unloading pusher 62 through its pushing and its retracting stroke. Cam followers 128, preferably in the form of rollers, carried by the conveyor support frame 82 adjacent the forward side thereof, engage the cams 120, whereby cams 120 control the tilting movement of the conveyor 60 about the axis of shaft 112.

Figure 5:
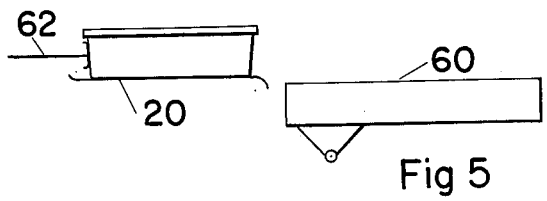
FIGURES 5, 6, 7 and 8 are diagrammatic views showing the relative positions of the discharge conveyor and the pans in one complete operating cycle.
Figure 6:
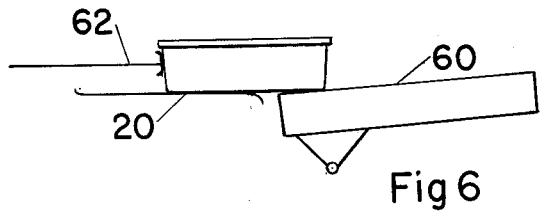

Referring to FIGURES 5, 6, 7 and 8 which show the relation of the conveyor 60 and a pan during tilting movement of the former and movement of the latter by the unloading pusher 62, and referring also to FIGURE 3, as the cams 120 rotate in clockwise direction from the positions shown in FIGURES 3 and 5, with the portion thereof from $a$ to the high point $b$ engaging the cam followers 128, the conveyor 60 tilts about the axis of shaft 112 to the position shown in FIGURE 6. The slope of the cams 120 and the arrangement of parts is such that the forward lower edges of a row of pans will engage the supporting surface of the conveyor 60 at or just before the pans are pushed by the unloading pusher 62 beyond their center of gravity, whereby the forward ends of the pans are moved onto the supporting surface of the conveyor 60 without dropping and jarring.

Figure 7:
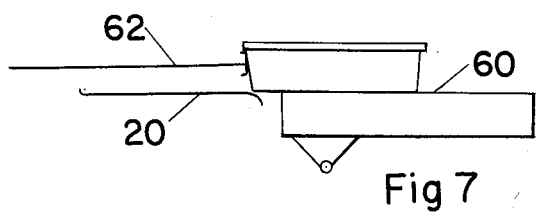

Upon continued rotation of the cams 120 from the high point $b$ to the low point $c$, the cam rollers 128 follow the descending slope of the cams 120, whereupon the conveyor 60 will rotate in the opposite direction beyond the horizontal position to that shown in FIGURE 7. In this latter position the upper edge of the rearward side of the conveyor 60 is substantially in the same horizontal plane as the rack shelf, so that as the pans are pushed from the rack shelf onto the conveyor 60 dropping and jarring of the rearward end of the pans is prevented.

Figure 8:
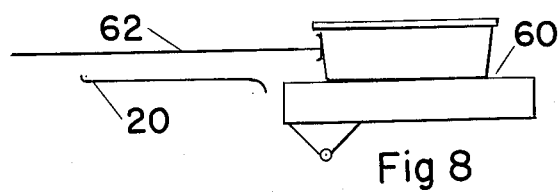

Further rotation of the cams 120 from the point $c$ to the point $d$ returns the conveyor 60 to its original horizontal position, as shown in FIGURE 8, while the pusher 62 pushes the pans to a position centrally between the forward and rearward sides of the conveyor 60. On the retracting stroke of the pusher 62, the cams 120 continue to rotate with the portion $d$ to $a$ engaging the cam followers 128 and maintaining the conveyor 60 in horizontal position.

It is clear that while the supporting surface of the conveyor 60 is in its normal horizontal position in a plane substantially below the plane of a rack shelf 20 when in its unloading position, the tilting of the conveyor 60 in timed relation with the unloading pusher effects a smooth discharge of the rows of pans of proofed dough without dropping and jarring of the pans.

While the invention has been described with reference to the transfer of pans of proofed dough from the rack shelves of a rack type proofer onto a discharge conveyor it will be apparent that it is adapted for slidably transferring various types of articles requiring delicate handling from a supporting surface onto a conveyor wherein the plane of the supporting surface from which the articles are to be pushed may under different conditions be displaced upwardly or downwardly with respect to the supporting surface of the conveyor onto which the articles are to be pushed.

I claim:
1. In an article transfer means, a first article support and an adjacent second article support, the supporting surfaces of said supports being in near horizontal alinement, a reciprocatable pusher adapted on its pushing stroke to push an article from said first support onto said second support, means pivotally mounting said second article support on an axis extending transversely of the direction of movement of said reciprocatable pusher for movement between a horizontal position and a tilted position wherein the edge of said second article support proximate said first article support is below the plane of said first article support and the edge of said second article support remote from said first article support is above said plane, and means for reciprocating said pusher and pivotally moving said second article support in timed relation including means controlling pivotal movement of said second article support to said tilted position during an initial portion of the pushing stroke of said pusher such that the lower forward edge of the article being pushed will engage the surface of said second article support before said article is pushed from said first article support to an overbalanced position and to said horizontal position during the final portion of the pushing stroke of said pusher.

2. A construction as set forth in claim 1 in which the means controlling pivotal movement of said second article support comprises cam means.

3. In an article transfer means, a first support having a horizontal article supporting surface and an adjacent second support having a normally horizontal article supporting surface disposed in a plane below said first article supporting surface, a reciprocatable pusher adapted on its pushing stroke to push an article from said first supporting surface onto said second supporting surface, means pivotally mounting said second support on an axis extending transversely of the direction of movement of said reciprocatable pusher for movement between a horizontal position and a tilted position wherein the extended plane of said first supporting surface intersects the plane of said second supporting surface, and means for reciprocating said pusher and pivotally moving said second support in timed relation including means controlling pivotal movement of said second support to said tilted position during an initial portion of the pushing stroke of said pusher such that the lower forward edge of the article being pushed will engage the surface of said second article support before said article is pushed from said first article support to an overbalanced position and to said horizontal position during the final portion of the pushing stroke of said pusher.

4. In an article transfer means, a first article support and an adjacent second article support, a reciprocatable pusher adapted on its pushing stroke to push an article from said first support onto said second support, means pivotally mounting said second article support on an axis extending transversely of the direction of movement of said reciprocatable pusher, rotatable cam means engaging said second article support for controlling pivotal movement thereof and means for reciprocating said pusher and rotating said cam in timed relation, said cam means being configured to effect pivotal movement of said second support during the pushing stroke of said pusher successively to a tilted position wherein the edge of the supporting surface of said second support remote from said first support is above the plane of the supporting surface of said first support and the opposite edge is below said plane, then to an oppositely tilted position and finally to a horizontal position, said second article support being arranged in said first tilted position to engage the leading lower edge of an article before said article is pushed from said first article support to an overbalanced position and arranged in said second tilted position to engage and support said article as the trailing end thereof is pushed off said first article support.

5. A construction as set forth in claim 4 in which said cam means is configured to retain siad second support in horizontal position during the retracting stroke of said reciprocatable pusher.

6. In an article transfer means, a first horizontal article supporting surface and an adjacent normally horizontal article supporting surface disposed in a plane below said first article supporting surface, a reciprocatable pusher adapted on its pushing stroke to push an article from said first supporting surface onto said second supporting surface, means pivotally mounting said second supporting surface on an axis extending transversely of the direction of movement of said reciprocatable pusher, rotatable cam means engaging said second article support for controlling pivotal movement thereof and means for reciprocating said pusher and rotating said cam in timed relation, said cam means being configured to effect pivotal movement of said second supporting surface during the pushing stroke of said pusher successively to a tilted position wherein the edge of said second supporting surface remote from said first supporting surface is above the plane of said first supporting surface, then to an oppositely tilted position wherein the edge of said second supporting surface proximate said first supporting surface is at least as high as the plane of said first supporting surface, and finally to a horizontal position to support said article against free fall throughout its transfer from said first article support to said second article support.

7. In an article transfer means, a first horizontal article supporting surface and an adjacent normally horizontal article supporting surface disposed in a plane below said first article supporting surface, a reciprocatable pusher adapted on its pushing stroke to push an article from said first supporting surface onto said second supporting surface, means pivotally mounting said second supporting surface on an axis extending transversely of the direction of movement of said reciprocatable pusher, means controlling pivotal movement of said second supporting surface and means for actuating said pusher and control means in timed relation, said control means effecting tilting movement of said second supporting surface to a first position wherein it is engaged by the lower leading edge of an article when said article is pushed from said first supporting surface to a normally overbalanced position, to a second oppositely tilted position wherein its edge adjacent said first supporting surface engages the bottom of an article as the lower trailing edge of said article is pusher clear of said first supporting surface, and finally to a horizontal position as said article is pushed wholly onto said second supporting surface.

8. A construction as set forth in claim 7 in which said control means for effecting tilting movement of said second supporting surface comprises cam means.

References Cited in the file of this patent

UNITED STATES PATENTS

| | | |
|---|---|---|
| 1,259,213 | Crawford | Mar. 12, 1918 |
| 2,482,427 | Melhorn | Sept. 20, 1949 |
| 2,752,050 | Nordquist | June 26, 1956 |